United States Patent [19]
Jungmann

[11] 3,985,614
[45] Oct. 12, 1976

[54] NUCLEAR REACTOR INSTALLATION

[75] Inventor: Axel Jungmann, Erlangen, Germany

[73] Assignee: Kraftwerk Union Aktiengesellschaft, Mulheim, Germany

[22] Filed: July 25, 1974

[21] Appl. No.: 491,666

[30] Foreign Application Priority Data

July 27, 1973 Germany............................ 2338337

[52] U.S. Cl............................. 176/87; 176/DIG. 2; 52/224; 52/249
[51] Int. Cl.² ........................................ G21C 13/04
[58] Field of Search .......... 176/87, DIG. 2; 52/224, 52/248, 249

[56] References Cited
UNITED STATES PATENTS

| | | | |
|---|---|---|---|
| 3,356,588 | 12/1967 | Beliaev ................................ | 176/87 |
| 3,438,857 | 4/1959 | Sulzer ................................ | 176/87 X |
| 3,712,851 | 1/1973 | Isberg et al. ...................... | 176/87 X |
| 3,898,126 | 8/1975 | Dorner et al. ..................... | 176/87 |
| 3,899,391 | 8/1975 | Sulzer et al. ..................... | 176/87 X |
| 3,899,393 | 8/1975 | Dorner et al. ..................... | 176/87 X |

Primary Examiner—Samuel W. Engle
Assistant Examiner—Peter A. Nelson
Attorney, Agent, or Firm—Kenyon & Kenyon Reilly Carr & Chapin

[57] ABSTRACT

A nuclear reactor metal pressure vessel is surrounded by a concrete wall forming an annular space around the vessel. Thermal insulation is in this space and surrounds the vessel, and a coolant-conductive layer is also in this space surrounding the thermal insulation, coolant forced through this layer reducing the thermal stress on the concrete wall. The coolant-conductive layer is formed by concrete blocks laid together and having coolant passages, these blocks being small enough individually to permit them to be cast from concrete at the reactor installation, the thermal insulation being formed by much larger sheet-metal clad concrete segments. Mortar is injected between the interfaces of the coolant-conductive layer and concrete wall and the interfaces between the fluid-conductive layer and the insulation, a layer of slippery sheet material being interposed between the insulation and the mortar. When the pressure vessel is thermally expanded by reactor operation, the annular space between it and the concrete wall is completely filled by these components so that zero-excursion rupture safeguard is provided for the vessel.

4 Claims, 1 Drawing Figure

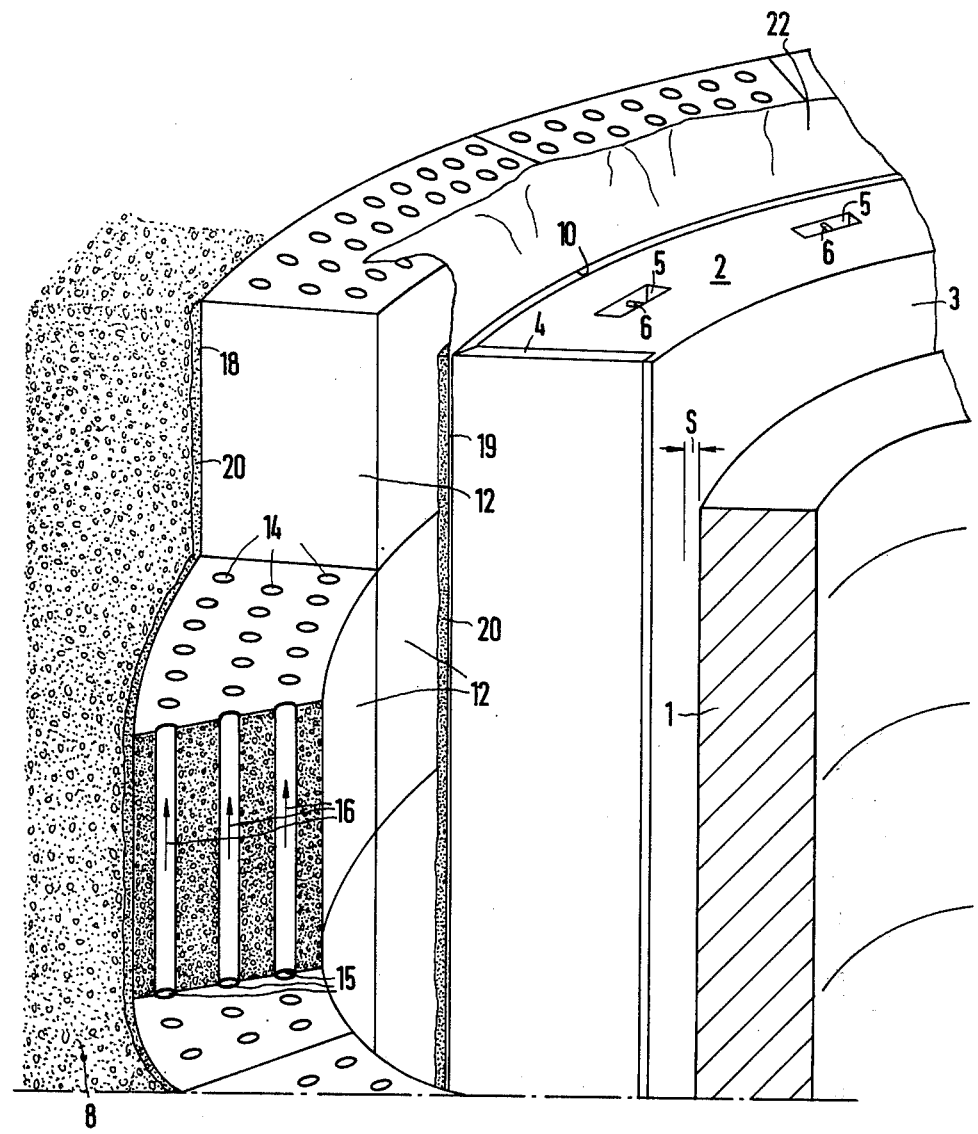

NUCLEAR REACTOR INSTALLATION

BACKGROUND OF THE INVENTION

The invention relates to a nuclear reactor installation comprising a reactor pressure vessel made of steel and which is surrounded by a concrete wall forming an annular space around the vessel, this wall being required both as a biological shield and as a containment for the vessel. To protect the concrete wall against excessive thermal stressing, thermal insulation surrounds the vessel in the annular space and a coolant-conductive layer is positioned between the thermal insulation and the concrete wall so that a coolant can be passed through this layer. The components described completely fill the annular space between the vessel and the concrete wall when the pressure vessel is thermally expanded by reactor operation, thus providing zeroexcursion rupture safeguarding of the vessel, the various components in the annular space being intended to have high compressive strength.

The thermal insulation which is next to the vessel, is designed for removal when the reactor is shut down and the vessel is cold, to permit external inspection of the vessel. Therefore, the insulation is made from concrete segments of large size and which may be lifted to clear an annular space around the vessel, using the usual containment crane. To provide the coolant-conductive layer, a sheet steel skin can be spaced from the concrete wall and filled with loose small particles such as steel balls, ceramic spheres, gravel or the like, which when compacted, becomes resistant to compression stress as required when the reactor is thermally expanded. However, this compaction required to carry the compression stress, via the loose particles, unfortunately produces a densification causing a high flow resistance or a coolant flow resistance to a coolant flow through the layer. If air is used, undesirably high air pressure are involved.

At the same time the loose particles can be poured between the skin and the concrete wall during erection of the installation, and this is a desirable advantage.

SUMMARY OF THE INVENTION

The object of the present invention is to improve on the above-type of installation, particularly in the direction of providing for a freer coolant flow but without losing the advantage of being able to fabricate the coolant-conductive layer locally at the installation.

According to the invention, the coolant-conductive layer is formed by concrete blocks laid together and having coolant passages formed through the blocks and which can be mutually registered from block-to-block to comprise continuous solidly defined coolant flow passages throughout the layer. These blocks may be cast from concrete using known techniques and they are made individually small enough to permit them to be cast at the reactor installation during its erection. Being solid, such blocks do not need to be confined by a metal skin to hold them in position once they are laid together.

The vessel and concrete wall are normally cylindrical or substantially cylindrical in contour and the blocks may be cast as small cylindrical segments so that the coolant-conductive layer they provide, is appropriately contoured. To provide for uniform compressive stressing, mortar is injected between the interfaces of this coolant-conductive layer and the concrete wall and between the interfaces between this layer and the insulation surrounding the vessel and contacted by the latter when it is thermally expanded, a sheet of plastic or metal being interposed between the mortar and the insulation. The sheet layer is not required to position the coolant-conductive layer because solidification of the mortar makes this unnecessary; the sheet of material forms a slide layer permitting easy relative sliding between it and the thermal insulation formed by the large concrete segments, as required to avoid mechanical stressing during possible thermally-induced movements of the insulation during reactor operation, keeping in mind that the pressure vessel thermally expands vertically as well as radially. Also, if the concrete segments forming the thermal insulation require removal when the pressure vessel is cold, vertical lifting of the segments is facilitated.

BRIEF DESCRIPTION OF THE DRAWING

The accompanying drawing illustrates a portion of the assembled components briefly described hereinabove, for the purpose of disclosing the presently preferred mode for carrying out the invention.

DETAILED DESCRIPTION OF THE INVENTION

Having reference to this drawing, the steel wall 1 of a pressurized-water reactor pressure vessel is shown with the thermal insulation 2 surrounding its outside and defining the smallspace S required for removal of the insulation when the pressure vessel is cold, this space disappearing when the vessel is hot during normal reactor operation. The thermal insulation is shown as comprising the cylindrical segments 3 formed by appropriate concrete cast inside of sheet steel cladding 4, these segments having depressions 5 in their top ends and in which lift bolts 6 are fixed for lifting of the segments during the installation, and if required, by the containment crane (not shown).

The concrete biological shield is shown at 8, this forming the concrete wall surrounding the pressure vessel 1 and defining the annular space mentioned previously. The inside surface of this wall is cylindrical to generally follow the contour of the cylindrical pressure vessel wall 1. The coolantconducting layer is shown as being formed by the cast concrete blocks 12 which, of course, have the shape of cylindrical segments, these blocks being cast with the coolant channels 14 which are mutually registered from block to block as indicated at 15.

These blocks 12 are of relatively small dimensions as compared to the size of the thermal insulation 3 so that they may be cast in a practical manner at the reactor installation during reactor erecting operations. Also, these blocks can be laid together without requiring the use of a heavy large crane. The blocks are, of course, cast from concrete of adequate compression resistance when solidified.

The interfaces between the blocks 12 and the concrete wall formed by the inside of the biological shield 8, and those between the blocks and the larger concrete segments 3, necessarily form small annular spaces, because it is impractical to provide the precision that would otherwise be required to completely eliminate such spaces. Therefore, these spaces, indicated at 18 and 19, have mortar 20 injected into them and completely filling them and providing for a uniform mechanical stress distribution when the mortar is solidified. This mortar injection is easily possible during the reactor installation erection.

To prevent the mortar from adhering to the concrete segments 3 of the installation, a sheet 22 is positioned next to the outside of the segments 3 after they are installed. This is the slide sheet previously referred to and may be made of plastic or metal. Various materials may be used providing they provide for sliding motion between the insulation 2 and the mortar interposed inside on the coolant-conductive layer formed by the blocks 12. This slide sheet 22 also permits vertical sliding action of the segments 3.

The solidified mortar 20, possibly aided by the slide sheet 22, assures that coolant flowed through the channels 14, as at 16, cannot escape to penetrate the thermal insulation 3 and possibly even reach the pressure vessel wall 1, which would produce non-uniform thermal stressing of those parts, which is obviously undesirable. The mortar also serves to rigidly position the relatively small concrete blocks 12 and their laid-together relationship.

What is claimed is:

1. A nuclear reactor installation comprising a reactor pressure vessel made of metal, a concrete containment wall surrounding said vessel and forming an annular space around the vessel, thermal insulation in said space and surrounding said vessel, and a coolant-conductive layer in said space and surrounding said insulation, said insulation and layer substantially filling said space and compressively providing zero-excursion rupture safeguarding for said vessel during reactor operation; wherein the improvement comprises said layer being formed by blocks laid together and having coolant passages, interfaces being formed between said layer and said concrete wall and between the layer and said insulation, and mortar being injected between said interfaces and solidified, said blocks being solid excepting for said passages.

2. The installation of claim 1 in which said blocks are concrete castings permitting their manufacture locally at said installation.

3. The installation of claim 2 in which a sheet layer surrounds said insulation between said mortar and the insulation, said layer being made of material permitting a sliding motion of said insulation relative to said mortar.

4. The installation of claim 1 in which said insulation comprises sheet-metal clad concrete segments laid together.

* * * * *